UNITED STATES PATENT OFFICE 2,232,078

AZO DYESTUFFS OF THE STILBENE SERIES

Hans Schindhelm, Bergen-Enkheim, near Frankfort-on-the-Main, Germany, assignor to General Aniline & Film Corporation, a corporation of Delaware No Drawing. Application August 12, 1939, Serial No. 289,783. In Germany August 18, 1938

4 Claims. (Cl. 260—157)

The present invention relates to new azodyestuffs of the stilbene series, more particularly to those of the general formula:

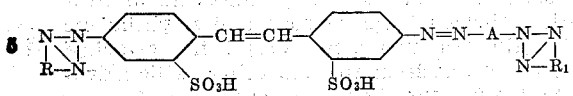

wherein R and $R_1$ stand for aromatic radicles of the naphthalene series and A stands for a member selected from the group consisting of aromatic radicles of the benzene and naphthalene series, the two nitrogen atoms being attached to A in para-position to each other.

The new dyestuffs may be prepared in the following manner: 4-nitro-4'-amino-stilbene-2.2'-disulfonic acid is diazotized and combined with an amine of the naphthalene series coupling in o-position to the amino group, and in the o-amino-azodyestuff formed the azo group and the amino group are converted into the triazole ring according to known methods. Then the nitro group in the 4-position of the stilbene radicle is reduced to the amino group, the amino compound formed is diazotized and the diazo compound obtained is combined with an amine coupling in para-position to the amino group. The amino-monoazodyestuff thus obtained is further diazotized and the diazo compound formed is combined with an amine of the naphthalene series coupling in o-position to the amino group and then the amino group and the azo group are converted into a triazole ring.

The manufacture of those azodyestuffs of the above general formula which contain for R and $R_1$ two identical radicles of the naphthalene series, may also be performed in the following manner: 4-nitro-4'-aminostilbene-2.2'-disulfonic acid is diazotized and the diazo compound formed is combined with an amine coupling in para-position to the amino group, then the nitro group is reduced and the diamino-monoazodyestuff obtained is tetrazotized and the tetrazo compound formed is combined with 2 molecular proportions of an amine of the naphthalene series coupling in ortho-position to the amino group. Finally the formation of the two triazole rings is performed. One may also start from 4.4'-diaminostilbene-2.2'-disulfonic acid, which compound is tetrazotized and combined only on one side of the molecule with 1 molecular proportion of an amine coupling in para-position to the amino group. The intermediate product thus obtained is then further diazotized and the tetrazo compound obtained is combined with two molecular proportions of an amine of the naphthalene series coupling in o-position to the amino group, whereupon the formation of the two triazole rings is performed.

The new dyestuffs are distinguished by a good affinity for vegetable fibers and by clear shades and excellent fastness to light of the dyeings obtained.

In order to further illustrate my invention the following examples are given, the parts being by weight and all temperatures in degrees centigrade.

Example 1

602 parts of the amino-triazole compound which is obtained by combining diazotized 4-nitro-4'-aminostilbene-2.2'-disulfonic acid with 1-aminonaphthalene-4-sulfonic acid, converting the amine group and the azo group into the triazole ring and reducing the nitro group in the 4-position of the stilbene radicle, are diazotized in the usual manner. The diazo compound formed is combined with 250 parts of the sodium salt of 1-aminonaphthalene-7-sulfonic acid in an aqueous solution containing an excess of sodium carbonate. When the combination is complete, the aminoazodyestuff formed is precipitated by the addition of sodium chloride, filtered off and again dissolved in water. After the addition of 69 parts of sodium nitrite the solution is poured into hydrochloric acid and the diazo compound formed is combined with 143 parts of 2-aminonaphthalene. When the combination is complete, the disazodyestuff obtained is separated and purified by washing with a sodium chloride solution of 24° Bé. Then it is dissolved in water and converted into the corresponding di-triazole compound by the addition of 520 parts of copper sulfate in the presence of ammonia.

The new dyestuff thus obtained corresponds to the formula:

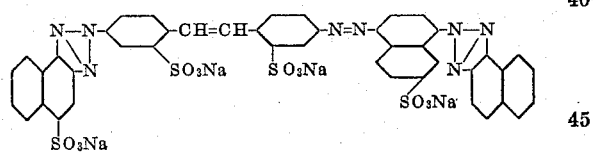

It is, when dry, an orange powder, soluble in water with an orange and in concentrated sulfuric acid with a blue color. It dyes vegetable fibers clear orange shades of excellent fastness to light.

The formation of the di-triazole compound may also be performed by means of other oxidizing agents such as for example alkali hypochlorite solution.

Similar dyestuffs are obtained by employing as end component instead of the 2-aminonaphthalene the carboxylic or sulfonic acid derivatives thereof or by employing other triazole compounds of the stilbene series as initial components.

*Example 2*

602 parts of the amino-triazole compound which is obtained by combining diazotized 4-nitro-4'-aminostilbene-2.2'-disulfonic acid with 2-aminonaphthalene-6-sulfonic acid, converting the amino group and the azo group into the triazole ring and reducing the nitro group in the 4-position of the stilbene radicle, are diazotized in the usual manner. The diazo solution obtained is combined in the presence of a mineral acid with 153 parts of 1-aminonaphthalene. The aminoazodyestuff formed is separated, purified and diazotized in the usual manner, and the diazo compound obtained is combined with 187 parts of 2-aminonaphthalene-3-carboxylic acid in an aqueous solution containing an excess of sodium carbonate. When the combination is complete, the disazodyestuff formed is treated in the presence of sodium hydroxide with an excess of sodium hypochlorite solution whereby oxidation takes place and the shade is changed from grey to orange.

The new dyestuff thus obtained corresponds to the formula:

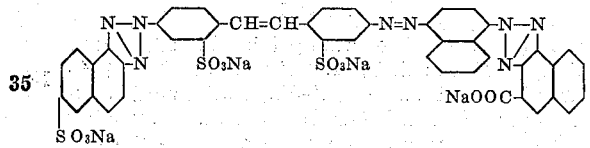

It is, when dry, an orange powder, soluble in water with an orange and in concentrated sulfuric acid with a blue color, dyeing cotton orange shades of very good fastness to light.

*Example 3*

602 parts of the triazole compound employed in Example 1 as starting material are diazotized and combined in a mineral acid containing solution with 107 parts of 3-amino-1-methylbenzene. The aminoazo dyestuff obtained is diazotized in the usual manner and the diazo compound formed is combined with 250 parts of the sodium salt of 1-amino-naphthalene-4-sulfonic acid. The diazodyestuff formed is isolated, freed from impurities, redissolved and oxidized by means of sodium hypochlorite in the presence of sodium hydroxide. Then the di-triazole formed is separated, washed and dried; it is an orange powder soluble in water with a clear yellow color and in concentrated sulfuric acid with a bluish red color.

The new dyestuff corresponds to the formula:

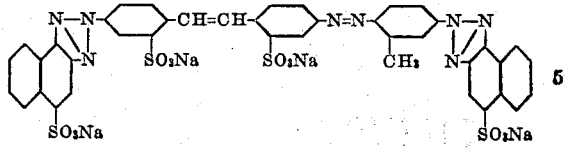

It dyes cotton clear yellow shades of excellent fastness to light.

Somewhat more greenish shades are obtained when employing for the manufacture of the above described dyestuff aniline instead of the 1-methyl-3-aminobenzene.

I claim:

1. The azodyestuffs of the stilbene series of the general formula:

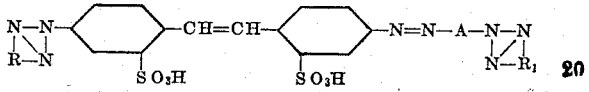

wherein R and $R_1$ stand for aromatic radicles of the naphthalene series and A stands for a member selected from the group consisting of aromatic radicles of the benzene and naphthalene series, the two nitrogen atoms being attached to A in paraposition to each other, which dyestuffs dye vegetable fibers clear shades of excellent fastness to light.

2. The azodyestuff of the formula:

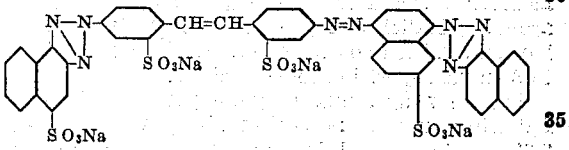

which dyestuff is an orange powder, dyeing vegetable fibers clear orange shades of excellent fastness to light.

3. The azodyestuff of the formula:

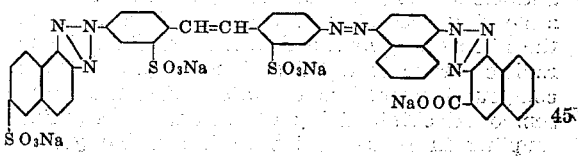

which dyestuff is an orange powder, dyeing vegetable fibers orange shades of very good fastness to light.

4. The azodyestuff of the formula:

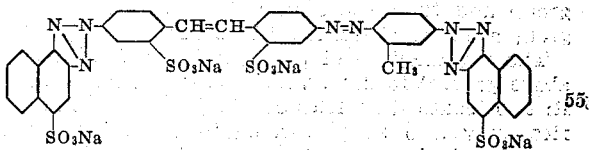

which dyestuff is an orange powder, dyeing vegetable fibers clear yellow shades of excellent fastness to light.

HANS SCHINDHELM.